(12) United States Patent
Komiya et al.

(10) Patent No.: US 9,701,054 B2
(45) Date of Patent: Jul. 11, 2017

(54) INJECTION MOLDING SYSTEM

(71) Applicant: FANUC Corporation, Yamanashi (JP)

(72) Inventors: Shingo Komiya, Yamanashi (JP);
Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 82 days.

(21) Appl. No.: 14/885,347

(22) Filed: Oct. 16, 2015

(65) Prior Publication Data
US 2016/0107358 A1   Apr. 21, 2016

(30) Foreign Application Priority Data

Oct. 17, 2014 (JP) .................. 2014-212722

(51) Int. Cl.
*B29C 45/16* (2006.01)
*B29C 45/76* (2006.01)
*B29C 45/03* (2006.01)

(52) U.S. Cl.
CPC ............ *B29C 45/762* (2013.01); *B29C 45/03* (2013.01); *B29C 45/16* (2013.01); *B29C 45/1615* (2013.01); *B29C 45/76* (2013.01); *B29C 45/1635* (2013.01); *B29C 2945/7617* (2013.01); *B29C 2945/76648* (2013.01)

(58) Field of Classification Search
CPC .. B29C 2945/7617; B29C 2945/76648; B29C 45/762; B29C 45/1615
See application file for complete search history.

(56) References Cited

U.S. PATENT DOCUMENTS

| 5,309,369 | A | 5/1994 | Kamiguchi et al. |
| 6,377,649 | B1 * | 4/2002 | Stuart ............ B29C 45/17 377/15 |
| 2003/0072831 | A1 * | 4/2003 | Poynor ............ B29C 45/76 425/145 |

FOREIGN PATENT DOCUMENTS

| JP | 4-49020 A | 2/1992 |
| JP | 4-267119 A | 9/1992 |
| JP | 2003-1687 A | 1/2003 |
| JP | 2004-167962 A | 6/2004 |
| JP | 2004-318262 A | 11/2004 |
| JP | 2008-074031 A | 4/2008 |
| JP | 2010110952 A | 5/2010 |
| JP | 2011-173243 A | 9/2011 |
| JP | 2011-186910 A | 9/2011 |

OTHER PUBLICATIONS

Office Action in JP Application No. 2014-212722, mailed Feb. 2, 2016.

* cited by examiner

*Primary Examiner* — Jill Heitbrink
(74) *Attorney, Agent, or Firm* — Hauptman Ham, LLP

(57) ABSTRACT

An injection molding system configured to complete molding by sequential injection molding by a plurality of injection devices, a data acquisition unit is configured to acquire an operation data, a count value of an injection molding number, and identification information of the injection device, and an injection molding number setting unit is configured to set the count number of the injection molding number stored in the injection molding number storing unit of each injection device composing the plurality of the injection devices to be same number, when the injection molding system begins the injection molding.

4 Claims, 7 Drawing Sheets

FIG. 7

| | | [F]FILLING TIME | [F]MEASURING TIME | [F]PRESSURE KEEPING COMPLETION POSITION | [R]FILLING TIME | [R]MEASURING TIME | [R]PRESSURE KEEPING COMPLETION POSITION |
|---|---|---|---|---|---|---|---|
| 43 | 10:36 | 0.61 | 0.42 | 25.50 | 1.0 | 0.19 | 33.94 |
| 42 | 10:35 | 0.60 | 0.42 | 25.49 | 1.0 | 0.18 | 33.93 |
| 41 | 10:35 | 0.60 | 0.42 | 25.49 | 1.0 | 0.19 | 33.96 |
| 40 | 10:35 | 0.60 | 0.42 | 25.51 | 1.0 | 0.19 | 33.94 |
| 39 | 10:35 | 0.60 | 0.42 | 25.49 | 1.0 | 0.19 | 33.93 |
| 38 | 10:35 | 0.60 | 0.42 | 25.49 | 1.0 | 0.18 | |
| 37 | 10:35 | 0.60 | 0.42 | 25.50 | | | |
| | | | | | | | |
| 25 | 10:33 | 0.60 | 0.42 | 25.51 | | | |
| 24 | 10:33 | | | | 1.0 | 0.18 | 33.93 |

INJECTION MOLDING SYSTEM

RELATED APPLICATIONS

The present application claims priority to Japanese Application Number 2014-212722, filed Oct. 17, 2014, the disclosure of which is hereby incorporated by reference herein in its entirety.

BACKGROUND OF THE INVENTION

1. Field of the Invention

The present invention relates to an injection molding system, and more particularly to an injection molding system which completes a molded article by sequential injection molding by a plurality of injection devices.

2. Description of the Related Art

In injection molding, method for manufacturing moldings assembling a plurality of components or materials, for adding value of the moldings by injection molding with function or design, is known. There are cases where, by using a plurality of injection devices, molding injections are executed in each injection device for completing a molded article in the injection molding. As method of the injection molding, the following is known.

For an example, a method is known where a molding turning device is mounted on an injection molding device and combination of a stationary mold and a movable mold is switched, and an uncompleted molding molded in an injection device is completed by sequentially performing injection moldings by the other injection devices. Both the stationary mold and the movable mold may be changed when the combination of a stationary mold and a movable mold is switched. Alternatively, other various methods including method where a common stationary mold may be used while the movable mold, opposing to the common stationary mold, may be sequentially changed, may be adopted.

As the other example, there is a method where an uncompleted molding molded by an injection molding device is loaded in a mold installed in the other injection molding device, such that a plurality of injection moldings are sequentially performed on the uncompleted molding for completing a completed molding.

In addition to that, operation data of moldings has been collected corresponding to molding cycle, for quality control of moldings by injection molding.

Japanese Patent Laid-Open No. 2008-74031 discloses a technique in which a part of components is discriminated at each molding cycle while acquiring monitoring data at molding, for process data by making the acquired monitoring data correspond to the component, in an injection molding device for sequentially molding a predetermined molding using a plurality of molds by changing a part of components in an injection molding device.

FIG. 5 shows flow of the operation, in which mold type of two mold types is determined, and data corresponding to each mold type are written in data area and displayed in display area of a screen of a monitor.

Japanese Patent Laid-Open No. 2010-110952 discloses a technique in which monitoring data of an injection molding device are displayed on a screen such that monitoring data of a first molding to be a completed molding and monitoring data of a second molding are displayed in the same line of the same column in association with the completed molding, in an injection molding device which molds a molding using injection molding of a first molding and a second molding on the first molding while sequentially changing combination of a stationary mold and a movable mold.

FIG. 6 shows an example of monitoring data disclosed in Japanese Patent Laid-Open No. 2010-110952, while FIG. 7 shows an example of monitoring data of a first art disclosed in Japanese Patent Laid-Open No. 2010-110952. IN FIG. 6, data of a first injection molding device and data of a second injection molding device are displayed in the same line of the same column, in order to prevent that a monitoring item of a second injection device is displayed one line shifted from a monitoring item of a first injection device.

It is not difficult to make the combination of each stationary mold and each movable mold correspond to the operation data in the control device for controlling the injection molding device when injection molding is performed in an injection molding device as disclosed in Japanese Patent Laid-Open No. 2008-74031 or Japanese Patent Laid-Open No. 2010-110952. However, it is difficult to perform correspondence of the operation data at injection molding by a plurality of injection molding devices since the control device for controlling each injection molding device are provided in each injection molding device, when an uncompleted molding molded by an injection molding device is loaded in a mold installed in the other injection molding device, such that a plurality of injection moldings are sequentially performed on the uncompleted molding for completing a completed molding, as the other example described above.

SUMMARY OF THE INVENTION

In view of the above-described problems in the prior art techniques, an object of the present invention is accordingly to provide an injection molding system enables to perform correspondence of the operation data at injection molding for any number of the injection molding device.

The injection molding system according to the present invention includes, a plurality of injection devices, a data acquisition unit configured to acquire data from the plurality of injection device, and an injection molding number setting unit, and configured to complete molding by sequential injection molding by the plurality of injection devices, each injection device composing the plurality of injection devices including an injection molding number counting unit configured to count injection molding number each time when injection molding is performed, an injection molding number storing unit configured to store a count value of the injection molding number counted by the injection molding number counting unit each time when injection molding is performed, an operation data storing unit configured to acquire and store operation data of the injection device each time when injection molding is performed, and an injection device identification information storing unit configured to store identification information of the injection device, wherein the data acquisition unit is configured to acquire the operation data stored in the operation data storing unit, the count value of the injection molding number counted by the injection molding number counting unit, and the identification information of the injection device stored by the injection device identification information storing unit, and the injection molding number setting unit is configured to set the count number of the injection molding number stored in the injection molding number storing unit of each injection device composing the plurality of the injection devices to be same number, when the injection molding system begins the injection molding.

The injection molding number setting unit sets the count number of the injection molding number stored in the injection molding number storing unit of each injection device composing the plurality of the injection devices to be same number, when the injection molding system begins the injection molding, in the injection molding device including a plurality of injection devices, such that, when the entire injection molding system is restarted while molding cycle of one of the injection molding devices is interrupted while molding cycle of the other injection molding device is continued, it is possible for the injection molding system to perform correspondence of the operation data of each injection molding device, by setting the count number of the injection molding number stored in the injection molding number storing unit of each injection device composing the plurality of the injection devices to be same number. It should be noted that, restart of the all injection devices composing the molding system is given as an example of the restart of the molding system, however the restart of the molding system is not limited to the case mentioned.

The injection molding system may further include a central management device configured to manage the plurality of the injection molding device, and the central management device includes the data acquisition unit and the injection molding number setting unit.

It is possible for the injection molding system to more effectively perform correspondence of the operation data of each injection molding device, since the central management device includes the data acquisition unit and the injection molding number setting unit.

The injection molding system may further includes a data display unit configured to display the operation data of each injection device composing the plurality of the injection devices in association with the count value of the injection molding number stored in the injection molding number storing unit of each injection molding device.

It is possible for the operator to easily grasp correspondence of the molded articles and the operation data by displaying the operation data of each injection device in association with the count value of the injection molding number.

The operation data of the injection device may include at least one of a physical quantity detected when the injection device performs the injection molding, content of change of molding condition of the injection device and day and time when the change is performed, and content of operation of the injection device and day and time when the operation is performed.

The present invention, with the configuration mentioned above, can stop the injection molding device by an appropriate processing when the failure occurs in the injection molding device including a plurality of injection devices.

BRIEF DESCRIPTION OF THE DRAWINGS

The above-described object, the other object, and the feature of the invention will be proved from the description of embodiments below with reference to the accompanying drawings. In these drawings:

FIG. 7 is a diagram showing an example of monitoring data of the prior art.

DETAILED DESCRIPTION OF THE PREFERRED EMBODIMENTS

Figure 1:
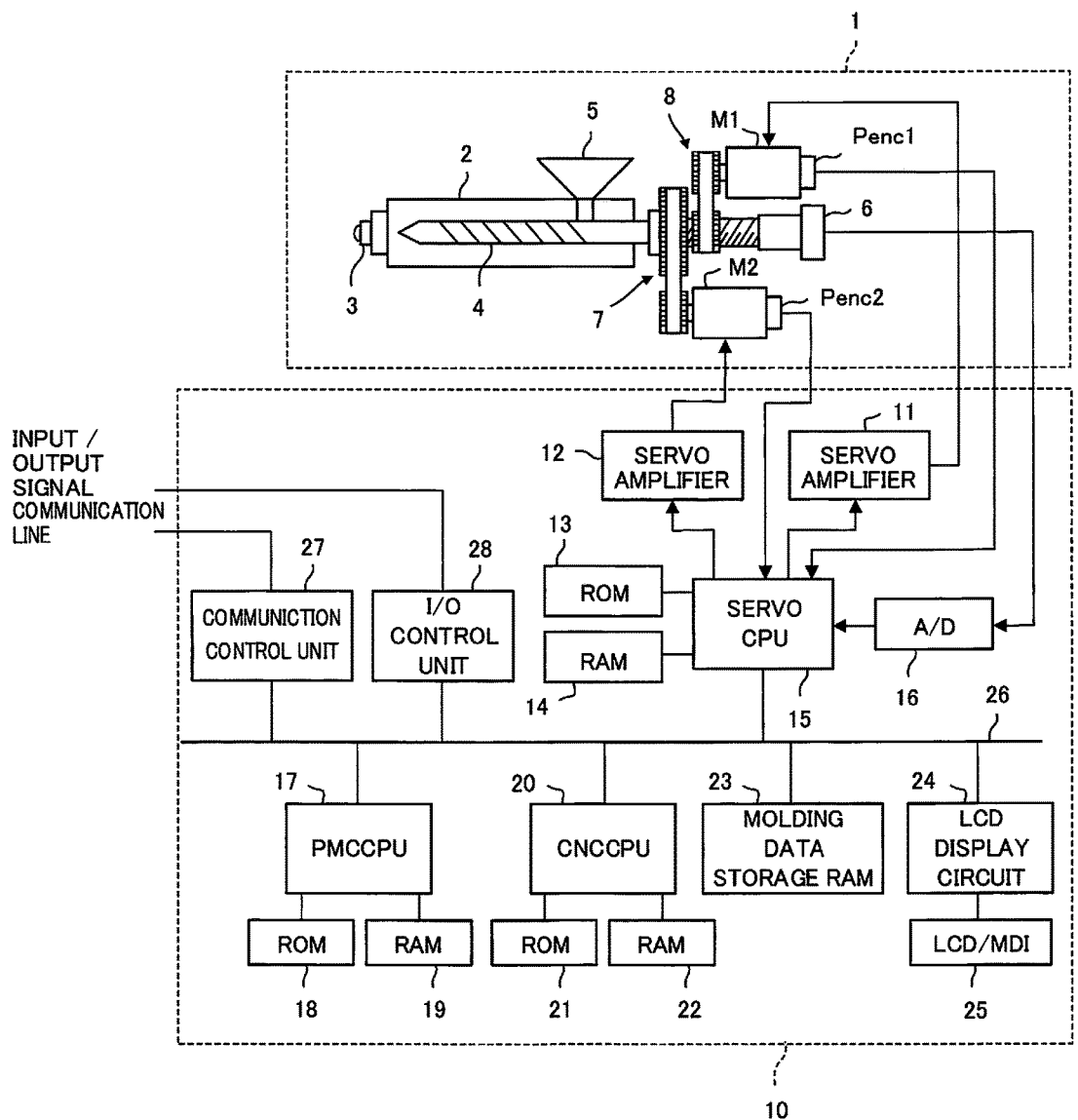
FIG. 1 is a configuration diagram of an injection device of the injection molding system according to an embodiment of the present invention.
Figure 2:
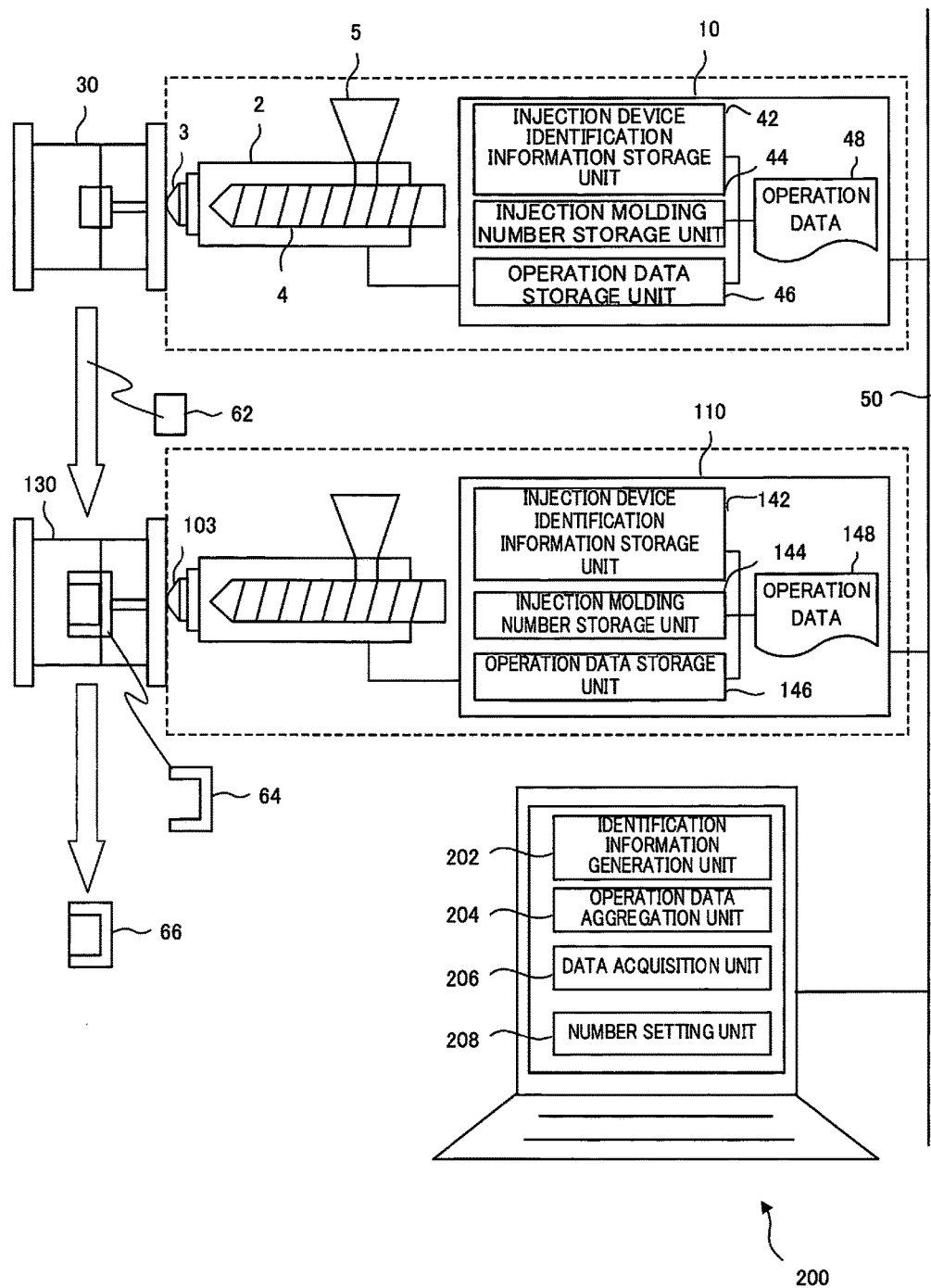
FIG. 2 is a configuration diagram of the injection molding system including the plurality of injection devices according to an embodiment of the present invention.

FIG. 2 is a configuration diagram of the injection molding system including the plurality of injection devices according to an embodiment of the present invention, while FIG. 1 is a configuration diagram of each injection device shown in FIG. 2. The injection molding device includes an injection device and a mold closing device on a base in general, and an injection mechanism section 1 corresponding to the injection device and a control device 10 for controlling entire injection mechanism section are shown in FIG. 1.

In the injection mechanism section 1, a nozzle 3 is attached to a front end of a cylinder 2, a screw 4 is inserted thereto, while a hopper 5 for supplying a resin pellet to the cylinder 2 is attached to a rear end of the cylinder 2. An injection servomotor M1, a transmission mechanism 8, and the like, as a drive unit of the screw 4 in shaft direction, and the screw is driven in the shaft direction by the servomotor M1, the transmission mechanism 8, and the like, for injection control and back pressure control. A servomotor M2 as a rotation unit for rotation of the screw 4 and a transmission mechanism 7 comprising a belt, a pulley are installed, and the screw 4 is rotary driven by the servomotor M2, and the transmission mechanism 7 comprising the belt, the pulley.

Each of the injection servomotor M1 and the screw rotation servomotor M2 is attached with a position and velocity detector Penc1 and a position or velocity detector Penc2 for detecting the rotation position and velocity of each servomotor. These position and velocity detectors Penc1 and Penc2 detects the position of the screw 4, that is the position in the screw shaft, and moving velocity, that is an injection speed, and rotation velocity of the screw 4. A force detector 6 such as a load cell for detecting force applied in the screw direction on the screw 4 by molten resin.

A ROM 18 and a RAM 19 are connected to a PMCCPU 17. The ROM 18 stores sequence program for controlling sequence motion of the injection molding device and the like. The RAM 19 is used for temporary memory of calculation data and the like. A ROM 21 and a RAM 22 are connected to a CNCCPU 20. The ROM 21 stores automatic operation program for controlling entire injection molding device and the like. The RAM 22 is used for temporary memory of calculation data and the like.

A ROM 13 and a RAM 14 are connected to a servo CPU 15. The ROM 13 stores control program dedicated to servo control which execute processing of position loop, velocity loop, and current loop. The RAM 14 is used for temporary memory of data. A servo amplifier 11 and a servo amplifier 12 are connected to the servo CPU 15. The servo amplifier 11 drives the injection servomotor M1 and the servo amplifier 12 drives the screw rotation servomotor M2 based on command from the servo CPU 15.

The position and velocity detector Penc1 is attached to the servomotor M1, while the position and velocity detector Penc2 is attached to the servomotor M2. Output from the position and velocity detectors Penc1 and Penc2 is fed-back to the servo CPU 15. The servo CPU 15 executes feedback control of position and speed based on movement command to each shaft, that is the injection servomotor M1 or the screw rotation servomotor M2, commanded by CNCCPU 20, and detected position and detected velocity fed-back from the position and velocity detector Penc1 and the position and velocity detector Penc2. The servo CPU 15 further executes feedback control of the current. Thus the servo CPU 15 drives and controls the servo amplifier 11 for driving the injection servomotor M1 and the servo amplifier 12 for driving the screw rotation servomotor M2.

A current position resistor for calculating forward position, that is shaft direction position, of the screw 4 based on position feedback signal from the position and velocity detector Penc1, such that the position of the screw is detected by the current position resistor. Resin pressure, that is resin pressure applied on the screw, which is converted from detected signal of the force detector 6 to digital signal by an A/D convertor 16, is input to the servo CPU 15.

LCD/MDI 25, that is an input device with a display device, having a display device of liquid crystal device or the like, is connected to a bus 26 through a LCD display circuit 24. A molding data storage RAM 23 having a volatile memory is connected to the bus 26. The molding data storage RAM 23 stores molding condition, each kind of set value, parameter, macro parameter, and the like, concerning injection molding operation.

Moreover, both a communication control unit 27 which controls sending and receiving of signal to and from a communication line, and an I/O control unit 28 which controls input signal and output signal, are connected to the bus 26.

Moreover, both a communication control unit 27 which controls sending and receiving of signal to and from a communication line, and an I/O control unit 28 which controls input signal and output signal, are connected to the bus 26.

With the configuration mentioned above, the PMCCPU 17 control sequence operation of entire injection molding device, the CNCCPU 20 distributes the movement command to the servomotors M1, M2 of each shaft based on the operation program stored in the ROM 21, the molding condition stored in the molding data storage RAM 23, and the like, the servo CPU 15 executes servo control, or digital servo control, of position loop control, velocity loop control, and current loop control as the prior art, based on the movement command distributed to each shaft, that is the injection servomotor M1 and the screw rotation servomotor M2, feedback signal of position and velocity detected by the position and velocity detectors Penc1, Penc2, and the like.

Molding operation process in an injection molding device includes mold clamping process in which molds are closed to be clamped in the mold clamping device, injecting process in which the screw is moved forward to inject and fill molten resin in the mold in the injection device, pressure keeping process in which resin pressure in the mold are kept after the molten resin is filled in the mold, cooling process in which resin in the mold is cooled, measuring process in which the molten resin is measured while rotating the screw with back pressure to melt the resin, preliminary injection process in which the screw 4 is moved in the shaft direction as pressure control from the end of the measurement to the start of the injection, mold opening process in which the mold is opened in the mold clamping device, ejection process in which the molded article is ejected from the mold, and the like. In general, such control method is often adopted as control method of injection and pressure keeping in the injection molding device, in that, position and velocity control of screw is performed from the start of the injection to the arrival to the predetermined screw position, that is the switching position from injection to pressure keeping, before the position and velocity control is switched to pressure control for keeping the pressure.

Pressure control with excellent response without delay to response speed to signal detection is possible according to the present embodiment, since pressure control is performed based on force detection value detected using the force detector 6 in the injection and pressure keeping process.

FIG. 2 is a configuration diagram of the injection molding system including the plurality of injection devices according to the present invention, as explained above. In the present embodiment, such an injection molding system will explained that includes two injection devices and each injection device sequentially performs injection molding to complete a molding, however such an injection molding system may be configured that more than two injection devices sequentially performs injection molding to complete a molded article.

Hereinafter, n-th injection molding device may be called "n-th injection molding device", injection molding in the n-th injection molding device may be called "n-th molding", and a molded article in the n-th molding may be called "an n-th molded article", in the description of the injection molding system including plurality of injection devices. In addition, the operation data acquired at injection molding for quality control of the molded article including the most forward position of the screw at the n-th molding and the maximum value of the injection pressure, "n-th operation data".

It should be noted that, example in which injection molding is performed using a plurality of the injection molding devices in the present invention, but there is no need for all of a plurality of molding devices to be injection molding devices, and one or some of the molding devices may be the injection device having at least an injection unit for filling molten resin in the mold.

Configuration of each injection device is similar to each other in FIG. 2, so what is not explained using FIG. 1 will be explained using the first injection device. Numeral "30" designates the mold, and resin is injected from the nozzle 3 therein for molding. Numeral "42" designates an injection device identification information storage unit, numeral "44" designates an injection molding number storage unit, and numeral "46" designates an operation data storage unit which stores operation data 48 acquired at the injection molding. The injection device identification information storage unit 42, the injection molding number storage unit 44, and the operation data storage unit 46 are provided in internal portion of the ROM 3, RAM 14 in FIG. 1, or the like if needed. Function of each unit will be described below.

Numeral "200" designates a central management device, and the central management device 200, the first injection device and the second injection device are connected with each other via a communication line 50. An identification information generation unit 202, an operation data aggregation unit 204, a data acquisition unit 206, and a number setting unit 208 are installed in the central management device 200. Function of each unit will be described below.

The injection molding system, with the configuration mentioned above, molds a first molded article 62 by molding in the first injection device, then loads the first molded article 62 in the mold 130 of the second injection device and a second molded article 64 is injection-molded on the first molded article 62 for molding a completed article 66.

In the molding process mentioned above, the operation data 48 in the first injection device is acquired to be stored in the operation data storage unit 46 in the first injection device, while the operation data 148 in the second injection device is acquired to be stored in the operation data storage unit 146 in the second injection device. The operation data aggregation unit 204 in the central management device 200 aggregates and stores the operation data stored in each operation data storage unit 46, 146 via the communication line 50, in order to make the operation data stored in the operation data storage units 46, 146 of each injection device correspond to the completed molded article.

The data acquisition unit 206 acquires the operation data, counted value of injection molding number, and identification information of the injection device. The number setting unit 208 sets the counted value of the injection molding number stored in the injection molding number storage unit of each injection device to be same number.

The identification information generation unit 202 generates the identification information to be given to data sent to each injection device from the central management device 200. The identification information includes count information of molding cycle which is to be discriminated and injection device identification information. It is discriminated to which of the plurality of injection devices the operation data of the injection device belong to by making the completed molded article by injection molding correspond to molding cycle.

The identification information sent from the central management device 200 is, stored in the injection device identification information storage unit 42 or the like in the first injection device. The count information of molding cycle included in the identification information is stored in the injection molding number storage unit 44. It is the case for the other injection devices.

Figure 3:
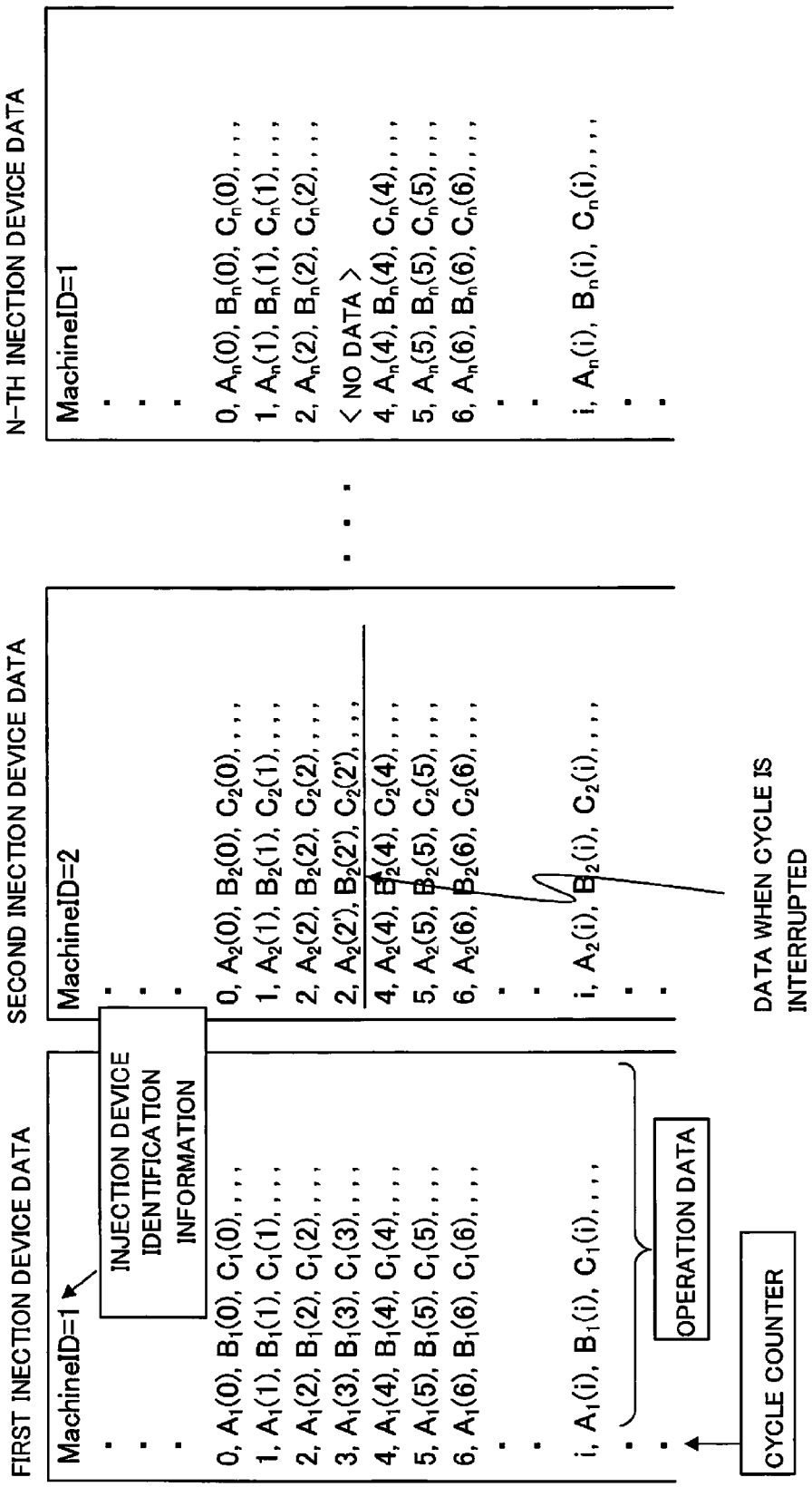
FIG. 3 is a diagram showing structure of the operation data of each injection device.

FIG. 3 is a diagram showing structure of the operation data of each injection device. The data of the first injection device, on the left side end of in FIG. 3, will be explained. The identification information of the injection device is written on the top line. "1" is set as injection device identification information for the data, since the data belong to the first injection device.

The left end column in the next line and the below shows cycle counter value, and number is incremented by one to be 0, 1, 2, 3, at each cycle. The next and subsequent lows shows the operation data acquired at the injection molding, and are configured to correspond to the each cycle counter. Hereinafter, the line in which the injection device identification information is written will be termed as "identification information line", and the line in which the cycle counter value is 0 will be termed as "0th line", and "first line", "second line" subsequently.

In the data of the first injection device, cycle counter 0 is displayed corresponding to the operation data of A1(0), B1(0), and C1(0) in the 0th line, cycle counter 1 is displayed corresponding to the operation data of A1(1), B1(1), and C1(1) in the 1th line, and the same in the subsequent line such that cycle counter i is displayed corresponding to the operation data of A1(i), B1(i), and C1(i) in the i-th line.

It is noted that, because the cycle is interrupted at cycle counter 2 at the data of the second injection device, the cycle counter in the third line is still 2 which corresponds to the A2(2'), B2(2'), and C2(2'), and the data in the third line is blank for the data of the n-th injection device as a result.

The data of each injection device may be displayed on the display device including a LCD/MDI 25 installed in the injection molding system or each injection system.

Figure 4:
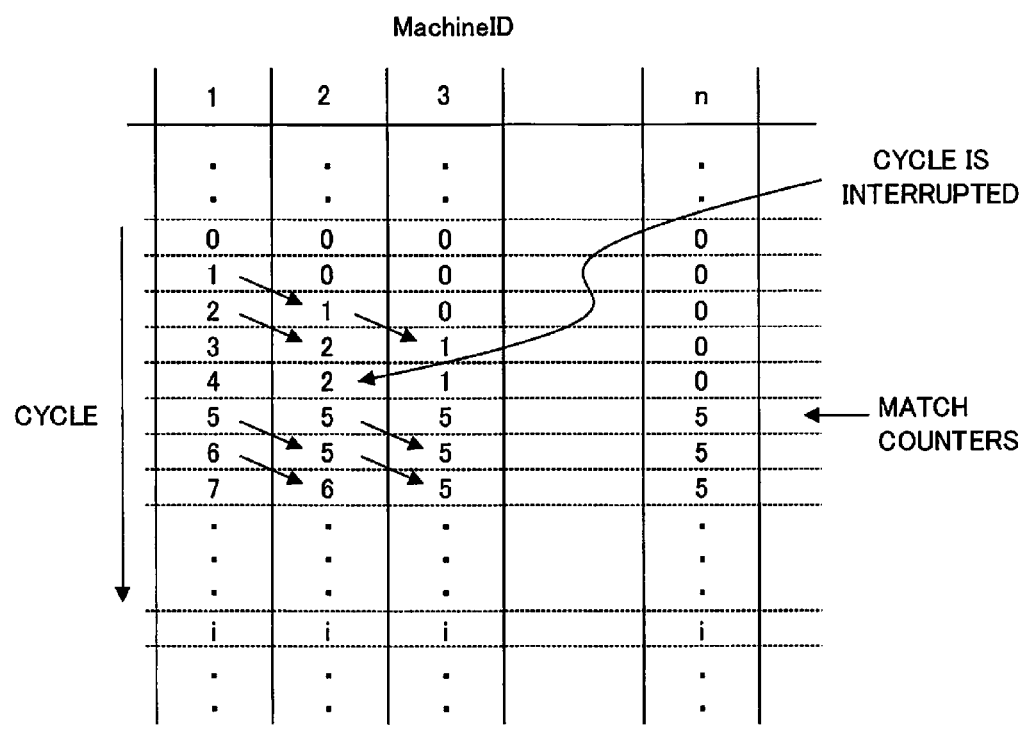
FIG. 4 is an example of cycle counter value acquired from each injection molding device in the central management system.
Figure 5:
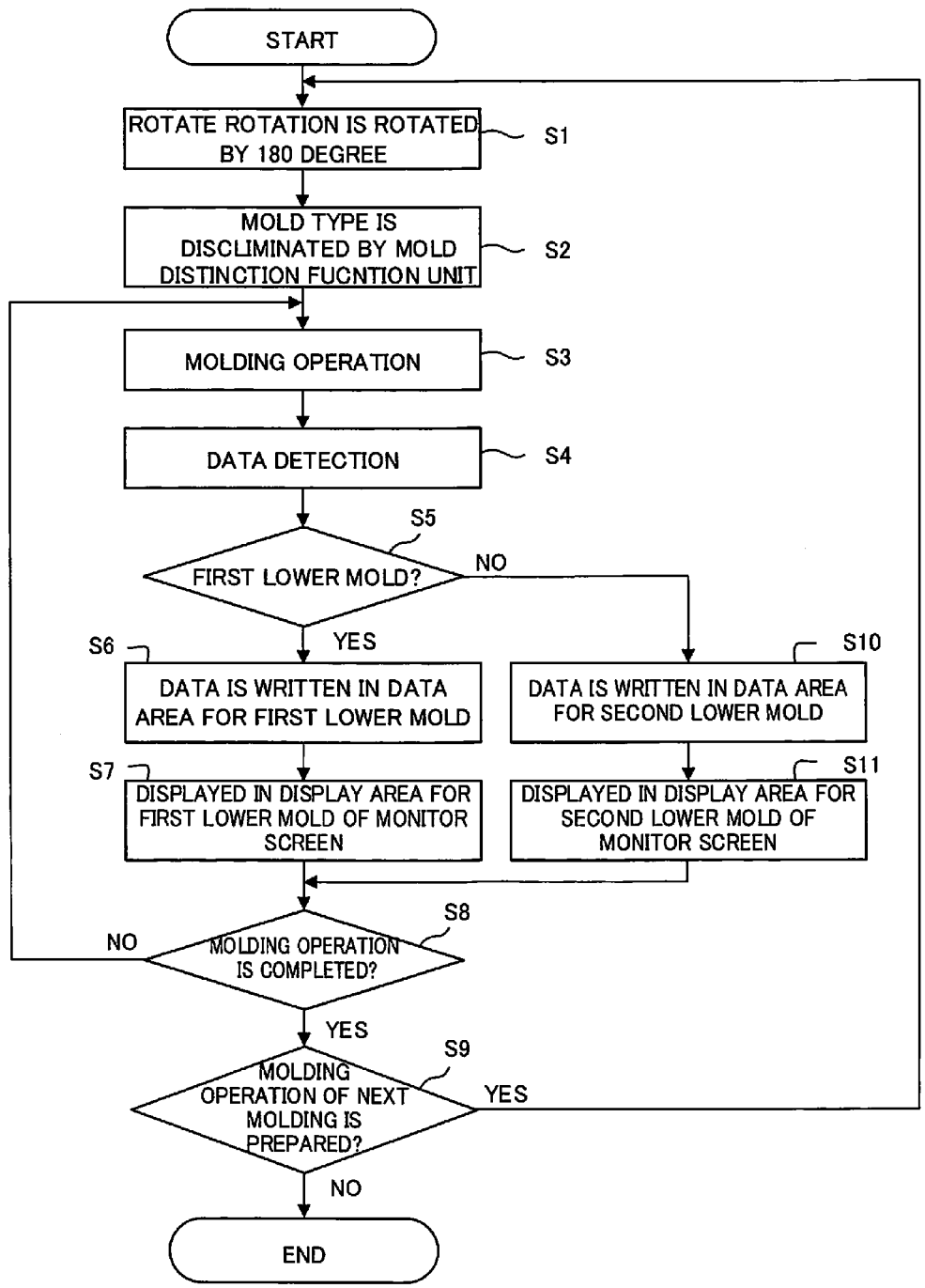
FIG. 5 is a diagram showing operation of the prior art.
Figure 6:
FIG. 6 is a diagram showing an example of monitoring data of the prior art.

Processing of data acquired from each injection device at the central management device 200 will be described below. FIG. 4 is an example of cycle counter value acquired from each injection molding device in the central management system, stored in the central management system. The horizontal axis represents the identification information of each injection device MachineID, while the vertical axis represents the cycle number of entire injection molding system. Hereinafter, the line in which all cycle numbers are 0 is referred to as the 0th line, and the subsequent lines as the first line, the second line, or the like.

In the present embodiment, as described above, completed molded article is molded by loading a first molded article, which is molded by the first injection device, in the mold of the second injection device for performing next molding repeatedly. Therefore, the cycle number will be different by one in the cycle number of entire injection molding system.

The details will be described using FIG. 4. In the 0th line, cycle counter is 0 since no injection device has performed molding. Next, in the first line, molding operation is performed in the first injection device, so the cycle counter in the MachineID1, which corresponds to the first injection device, is 1, and the cycle counter is 0 for the other injection devices.

In the next second line, the molded article, molded in the first injection device, is loaded in the second injection device and the next molding is performed, while the other molding operation is performed in the first injection device. Therefore, the cycle counter in MachineID 1 corresponding to the first injection device is 2, the cycle counter in MachineID 2 corresponding to the second injection device is 1, and the cycle counter is 0 for the other injection devices.

Molding operation is sequentially performed similarly in the third line, so the cycle counter in MachineID 1 corresponding to the first injection device is 3, the cycle counter in MachineID 2 corresponding to the second injection device is 2, the cycle counter in MachineID 3 corresponding to the third injection device is 3, and the cycle counter is 0 for the other injection devices.

In FIG. 4, an example, in which the molding operation is interrupted in the cycle next to the cycle of the cycle counter of the second injection device being 2, is shown. The cycle counter in MachineID 2 corresponding to the second injection device is still 2 in the fourth line since the cycle is interrupted, and the next operation is not performed since the molded article from the second injection device is not loaded and the cycle counter is not changed from the former state in the subsequent injection device.

In the situation mentioned above, there is a possibility that correspondence among operation data of each injection device become impossible since correspondence relationship is different from that of the cycle counter value of each injection device when entire injection molding system works normally.

Therefore, in the present embodiment, the cycle counter values of all injection devices are set to be same at restart of molding operation after the molding operation is interrupted at any one of the injection devices. In the present embodiment, the cycle counter value is set to be 5 of the cycle counter value of the first injection device, which is the maximum value in the fifth line, and the cycle counter value of each injection device is subsequently incremented in and after the next cycle. Thus the correspondence of the operation data of each injection device become possible again. It should be noted that, the cycle counter values are set to be the maximum cycle counter value, which is 5 in the present embodiment, in the line next to the cycle in which the molding operation is interrupted in any one of the injection devices, in the present embodiment. However, the cycle counter values may be reset to 0, or other number.

As described above, the cycle counter values, reset in the operation data aggregation unit 204 of the central management device 200, are sent to the injection molding number storing unit of each injection device via the communication line, and the stored injection molding number is revised.

At restart of molding operation after the molding operation is interrupted at any one of injection devices, the molded article which is molded by part but not completed in the last molding in the last injection device will be disposed, and molding operation will be restarted at the first injection device.

In the present embodiment, cycle counter values of all injection devices are set to be the same value at restart of molding operation after the molding operation is interrupted at any one of injection devices. Alternatively, considering the fact that the cycle counter values are different by one between the two adjacent injection devices in FIG. 4, difference of cycle counter value may be stored at each injection in each injection device, and the cycle counter value of each injection device may be set such that difference is equal to the difference stored in each injection device at the restart of the molding operation after the interruption, for enabling the correspondence of the operation data of each injection device.

It should be noted that aggregation of the operation data of each injection device, correction of the cycle counter values, and the like are executed in the central management device 200 outside each injection device in the present embodiment, but the invention is not limited to the example, and the central management device 200 may be set in any of the injection devices.

The invention claimed is:

1. An injection molding system including a plurality of injection devices, a data acquisition unit configured to acquire data from the plurality of injection device, and an injection molding number setting unit, and configured to complete molding by sequential injection molding by the plurality of injection devices, each injection device composing the plurality of injection devices comprising:
    an injection molding number counting unit configured to count injection molding number each time when injection molding is performed;
    an injection molding number storing unit configured to store a count value of the injection molding number counted by the injection molding number counting unit each time when injection molding is performed;
    an operation data storing unit configured to acquire and store operation data of the injection device each time when injection molding is performed; and
    an injection device identification information storing unit configured to store identification information of the injection device; wherein
    the data acquisition unit is configured to acquire the operation data stored in the operation data storing unit, the count value of the injection molding number counted by the injection molding number counting unit, and the identification information of the injection device stored by the injection device identification information storing unit, and
    the injection molding number setting unit is configured to set the count number of the injection molding number stored in the injection molding number storing unit of each injection device composing the plurality of the injection devices to be same number, when the injection molding system restarts injection molding after any injection device that forms the plurality of the injection devices interrupts the operation.

2. The injection molding system according to claim 1, wherein the injection molding system further comprising:
    a central management device configured to manage the plurality of the injection molding device, and
    the central management device comprises the data acquisition unit and the injection molding number setting unit.

3. The injection molding system according to claim 1, further comprising:
    a data display unit configured to display the operation data of each injection device composing the plurality of the injection devices in association with the count value of the injection molding number stored in the injection molding number storing unit of each injection molding device.

4. The injection molding system according to claim 1, wherein the operation data of the injection device includes at least one of
    a physical quantity detected when the injection device performs the injection molding,
    content of change of molding condition of the injection device and day and time when the change is performed, and
    content of operation of the injection device and day and time when the operation is performed.

* * * * *